US010981117B2

(12) United States Patent
Iyer et al.

(10) Patent No.: US 10,981,117 B2
(45) Date of Patent: Apr. 20, 2021

(54) BLENDED POTTING RESINS AND USE THEREOF

(71) Applicant: Entegris, Inc., Billerica, MA (US)

(72) Inventors: Ganapathysubramanian Iyer, Woburn, MA (US); Cha Doh, Sudbury, MA (US)

(73) Assignee: ENTEGRIS, INC., Billerica, MA (US)

(*) Notice: Subject to any disclaimer, the term of this patent is extended or adjusted under 35 U.S.C. 154(b) by 0 days.

(21) Appl. No.: 15/742,661

(22) PCT Filed: Jun. 30, 2016

(86) PCT No.: PCT/US2016/040425
§ 371 (c)(1),
(2) Date: Jan. 8, 2018

(87) PCT Pub. No.: WO2017/007683
PCT Pub. Date: Jan. 12, 2017

(65) Prior Publication Data
US 2018/0200676 A1 Jul. 19, 2018

Related U.S. Application Data

(60) Provisional application No. 62/190,617, filed on Jul. 9, 2015.

(51) Int. Cl.
B01D 63/02 (2006.01)
C08J 5/24 (2006.01)
(Continued)

(52) U.S. Cl.
CPC ......... *B01D 63/023* (2013.01); *B01D 63/022* (2013.01); *C08J 5/24* (2013.01);
(Continued)

(58) Field of Classification Search
CPC ............... B29C 66/71; B29C 66/8122; B29C 66/53261; B01D 63/022; B01D 63/02;
(Continued)

(56) References Cited

U.S. PATENT DOCUMENTS 3,428,591 A 2/1969 Lewis
4,155,957 A * 5/1979 Sasayama ............ C09J 123/08
525/108

(Continued)

FOREIGN PATENT DOCUMENTS

CN 1970614 A 5/2007
CN 101198397 A 6/2008
(Continued)

*Primary Examiner* — Ana M Fortuna
(74) *Attorney, Agent, or Firm* — Entegris, Inc.

(57) ABSTRACT

A thermoplastic blended potting resin, a blended resin potted membrane, a membrane separation module, a fluid separation device, a method of making and a method of using the membrane separation module and the fluid separation device are described herein. The blended thermoplastic potting resin comprises at least one polar membrane having two end regions and a middle region; and a blended resin comprising a non-polar thermoplastic polymer and a polar thermoplastic polymer; wherein at least one of the two ends regions is coated with the blended potting resin to form a fluid-tight seal between the end regions and the open middle region, and wherein the polar thermoplastic polymer is 1% or greater by weight of blended resin.

10 Claims, 8 Drawing Sheets

(51) Int. Cl.
  *C08L 23/06* (2006.01)
  *C08L 23/26* (2006.01)
(52) U.S. Cl.
  CPC ............... *C08L 23/06* (2013.01); *C08L 23/26* (2013.01); *C08J 2323/06* (2013.01); *C08J 2423/26* (2013.01); *C08J 2477/00* (2013.01); *C08L 2023/44* (2013.01); *C08L 2205/025* (2013.01); *C08L 2205/16* (2013.01); *C08L 2207/04* (2013.01); *C08L 2207/062* (2013.01)
(58) Field of Classification Search
  CPC ... B01D 63/021; B01D 63/024; B01D 63/023
  See application file for complete search history.

(56) References Cited

U.S. PATENT DOCUMENTS

| | | | | |
|---|---|---|---|---|
| 4,269,712 | A | | 5/1981 | Hornby et al. |
| 4,666,543 | A | * | 5/1987 | Kawano ................. B01D 63/02 156/169 |
| 5,162,101 | A | * | 11/1992 | Cosentino ........... A61M 1/1698 128/DIG. 3 |
| 5,695,702 | A | * | 12/1997 | Niermeyer ............. B01D 63/02 264/129 |
| 6,663,745 | B1 | * | 12/2003 | Cheng ................... B01D 63/02 156/293 |
| 6,918,886 | B1 | * | 7/2005 | Baurmeister ......... A61M 1/342 210/321.72 |
| 7,308,932 | B2 | * | 12/2007 | Doh ....................... B01D 63/02 165/158 |
| 8,091,618 | B2 | * | 1/2012 | Doh ....................... B01D 63/02 165/157 |
| 8,865,051 | B1 | * | 10/2014 | Rowley ................... B29C 71/04 264/248 |
| 2005/0161389 | A1 | * | 7/2005 | Takeda ................... B01D 63/04 210/321.75 |
| 2014/0263061 | A1 | | 9/2014 | Taylor et al. |
| 2015/0093536 | A1 | * | 4/2015 | Bhakta ..................... H01B 3/28 428/76 |
| 2017/0305081 | A1 | * | 10/2017 | Fischer .................... B29C 71/02 |
| 2018/0200676 | A1 | * | 7/2018 | Iyer ...................... B01D 63/022 |
| 2019/0247560 | A1 | * | 8/2019 | Storr .................... A61M 1/3489 |

FOREIGN PATENT DOCUMENTS

| | | |
|---|---|---|
| CN | 101885869 A | 11/2010 |
| JP | S55157305 A | 12/1980 |
| JP | H04235720 A | 8/1992 |
| JP | 2007516834 A | 6/2007 |
| JP | 4235720 B2 | 3/2009 |
| WO | 99/35206 A1 | 7/1999 |
| WO | 00/44483 A2 | 8/2000 |

* cited by examiner

BLENDED POTTING RESINS AND USE THEREOF

RELATED APPLICATION

This application claims the benefit of International Application No. PCT/US2016/040425, filed Jun. 30, 2016, which in turn claims priority to U.S. Provisional Application No. 62/190,617 filed on Jul. 9, 2015, both of which are incorporated herein by reference in their entireties for all purposes.

BACKGROUND OF THE INVENTION

Membranes used for most common applications are potted using thermosetting adhesives or sealants which are in a liquid state (low viscosity state) when applied to the fibers and then solidify around the fiber after curing. Some examples are, epoxy and acrylics. These work because they are initially in the form of a low viscosity liquid which can percolate in between the fibers and into the surface pores of the fiber to form a strong bond once they solidify. Some of the sealants also form a chemical bond with the fiber material. But sealant or adhesive based potting tends to be very dirty and frequently shed particles or leach impurities in application solvents. So these are not preferred for "clean" applications (applications which require high levels of purity in the manufacturing environment) such as for fluids used in semiconductor industry.

Thermoplastics have been used for potting hollow fibers to overcome the drawbacks of thermosetting adhesives and sealants. Membranes used in clean applications, such as semiconductors are potted using thermoplastic polymers, otherwise referred to as potting resins. The thermoplastics resins are applied to the membranes in a molten liquid state using special techniques like spiral lamination or centrifugal potting, and subsequently solidified around the membrane upon cooling creating a fluid-tight seal. Generally, the thermoplastic resin is physically and/or chemically compatible with the membrane material to promote bonding of the potting resin to the membrane and to ensure integrity of the bond. Once the membranes are potted together, they are bonded into a housing which becomes part of the filter device. The potting material must also be physically and/or chemically compatible to the housing material in order to create a sufficiently strong bond.

When the housing, potting resin and membranes are physically and/or chemically incompatible with each other, structural defects in the filter device and sealing failures between the membrane and the potting can occur. Thus, there is a need to develop potting materials that can be used in applications when it is desirable to join together housings and membranes that are physically and/or chemically incompatible with each other.

SUMMARY OF THE INVENTION

The present invention is directed to the discovery that a membrane and a housing constructed from materials that do not share similar physical and/or chemical properties (e.g., one is polar and the other non-polar) can be fluidly sealed and bonded through the use of a blended potting resin. Specifically, the present invention is directed to blended thermoplastic resins, potted membranes, membrane separation modules, methods of making membrane separation modules, and methods of using membrane separation modules, all of which use the blended thermoplastic potting resins described herein. The blended potting resins allow for greater flexibility in designing membrane separation modules having membranes and housings constructed from different materials (e.g., one polar and the other non-polar), while maintaining high structural integrity demands of the filtration industry.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
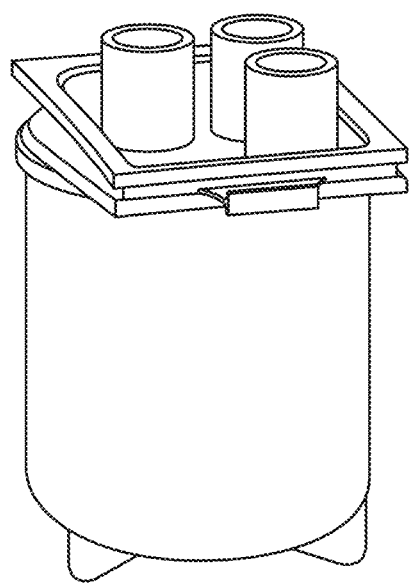
FIGS. 1A-B illustrate example embodiments of a housing holding a polar membrane and potting resin useful in the present invention.

While this invention has been particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular molecules, compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "membrane" is a reference to one or more membranes and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Filtration Devices, Membrane Materials, and Methods for Making Membrane Modules

The present invention is directed to the discovery that a membrane and housing constructed from materials that do not share similar physical and/or chemical properties (e.g., one is polar and the other non-polar or one is hydrophilic and the other is hydrophobic) can be sealingly joined together through the use of a blended thermoplastic potting resin comprising a polar thermoplastic polymer and a non-polar thermoplastic polymer, without compromising the structural integrity of the membrane. Accordingly, the present invention is directed to thermoplastic blended potting resins, blended resin potted membranes, membrane separation modules, fluid separation devices, methods of making membrane separation modules and fluid separation devices, and methods of using membrane separation modules and fluid separation devices, all of which use blended potting resins described herein to sealingly join physically and/or chemically incompatible polymeric components together.

It is shown herein that only a small amount of a polar thermoplastic polymer incorporated into a non-polar thermoplastic potting resin can sufficiently create a bridge between a non-polar thermoplastic polymer component (e.g., a housing) and a polar thermoplastic component (e.g., one or more membranes). This bridge allows the two physically and/or chemically incompatible materials to be sealingly joined to create a fluid-tight seal in a housing of suitable structural integrity for separation/filtration applications, particularly for use in the semiconductor manufacturing industry.

The present invention exhibits numerous advantages over the prior art including: (1) strong adherence of the membrane to the potting resin; (2) seamless bonding of the potting resin to both the membrane and the housing; (3) minimal degradation of the membrane; (4) potting can be achieved at lower temperatures; (5) potting can also be achieved at higher temperatures; (6) small variations in the shape of the membrane will not have an effect on the potting; and (7) higher packing density.

In one example embodiment, the present invention is either (1) a thermoplastic blended potting resin comprising a non-polar thermoplastic polymer and a polar thermoplastic polymer, wherein the polar thermoplastic polymer is greater than about 1% by weight of the total weight percent of the blended resin; or (2) a modified thermoplastic polymer comprising polar groups, wherein the polar groups are about 0.1% or greater by weight of the total weight of the modified thermoplastic polymer.

In another example embodiment, the polar thermoplastic polymer is greater than about 5% by weight of the total weight percent of the blended resin (e.g., about 5% to about 100% by weight of the total weight percent of the blended resin). In another example embodiment, the polar thermoplastic polymer is between about 5% and about 50% by weight of the total weight of the blended resin. In another example embodiment, the polar thermoplastic polymer is about 5%, 10%, 15%, 20%, 25%, 30%, 35%, 40%, 45%, or 50% by weight of the total weight percent of the blended resin.

In another example embodiment, the modified thermoplastic polymer comprises polar groups from about 0.1% to about 75% by weight of the total weight of the modified thermoplastic polymer. In another example embodiment, the blended resin comprises a non-polar thermoplastic polymer and the modified thermoplastic polymer, wherein the modified thermoplastic polymer is about 1% to about 100% by weight of the total weight of the blended resin.

At these levels, as described herein, the blended resin is capable of sealingly joining polar and non-polar components to form membrane separation modules and devices comprising the membrane separation modules that have structural integrity comparable to membrane separation modules where the components are constructed from the same material. Structural integrity of a membrane module potted with a blended resin of the invention or a devices comprising the potted membranes can be assessed, for example, by performing at least one of the following tests: Pull Test, Aerosol Test, and Air Bubble Test, as more fully described below. A potted membrane will have good adhesion of the membrane to the blended resin and will lack defects that could cause device failures.

The non-polar thermoplastic polymer component of the blended resin is typically selected to be the same polymer as that of the housing. For example, if the housing is constructed of polyethylene, then the non-polar thermoplastic polymer will also be polyethylene.

The blended resins of the invention allow polar and non-polar components to be sealingly joined—membrane to resin, and potted membrane to device housing. Below, reference is made to joining a polar membrane to a non-polar housing using a blended resin for the sake of simplicity. A person having skill in the art would readily recognize that the materials and methods described below could easily be used to join a non-polar membrane to a polar housing.

As used herein, a "polar thermoplastic polymer" is defined as a polymer resin that comprises up of polar repeating units (e.g., amide units to create a polyamide) or a non-polar polymer resin that is modified with polar chemical groups (e.g., anhydride modified polyethylene) or made by copolymerization of non-polar repeating units with polar repeating units (e.g., poly(ethylene-co-vinyl acetate) and poly(ethylene-co-vinyl alcohol)). In non-polar thermoplastic polymer modified with a polar group or copolymerized with polar groups (e.g., anhydride modified polyethylene) useful in the present invention, the polar group is about 0.1% by weight of the total weight of the polar thermoplastic polymer to about 75% by weight of the total weight of the polar thermoplastic polymer.

A "modified thermoplastic polymer," as used herein, refers to a thermoplastic polymer modified with a polar group, or copolymerized with a polar group, or formed by repeating units. In another example embodiment, the blended resin comprises the polar thermoplastic polymer from about 1% to about 100% by weight of the total weight of the blended resin.

Examples of suitable polar thermoplastic polymers that can be incorporated into a non-polar thermoplastic polymer resin to form a blended potting resin include, but are not limited to, polyethylene maleic anhydrides, ethylene vinyl alcohols, ethylene vinyl acetates, ethylene acrylic acids and polybutadiene maleic anhydride.

As used herein, a "nonpolar thermoplastic polymer" is defined as a polymer resin that does not contain any polar groups or repeating units, or are otherwise hydrophobic. Examples of non-polar resins used in the blend include low density polyethylene, linear low density polyethylene, high density polyethylene, polypropylene, polystyrene, polybutadiene, poly(tetrafluoroethylene-co-perfluoro(alkyvinylether)), TEFLON® perfluoroalkoxyalkane (PFA), or perfluoromethylalkoxy (MFA).

The blends can be used in the potting either homogeneously or non-homogeneously. In certain cases a homogeneous blends can be made by mixing the pellets or powder of the polar and non-polar resin homogeneously and melting it in an extruder or a centrifugal potting setup. The homogenous melt can then be used for potting. In other cases non-polar resins can be melted separately and then applied to the membrane as a "tie" layer between, for example, the polar membrane and the non-polar resin melt in a non-homogeneous blend using an appropriate die.

Membranes can be constructed from a number of different polymeric materials readily identifiable by one of ordinary skill in the art. For example, as described in U.S. Pat. Nos. 5,695,702, 7,308,932, and 8,091,618 (all of which are incorporated herein by reference), hollow fiber membranes can be constructed from ultrahigh molecular weight polyethylene. Examples of suitable polar membranes include, but are not limited to, membrane constructed from polar polymers such as polyamides (e.g., NYLON 6, NYLON 66), polyimideamides (e.g., TORLON®), polyimides, polysulfones, cellulose acetates, polyvinyl alcohols, polyacrylates, or membranes containing polar groups such as amides, acrylates, sulfamides, thiols, amines or containing charged or ionizable groups such as sulphonic acid groups, quaternary ammonium groups, sulfate groups, carboxylic acid groups and the like.

Additionally, the membrane can be constructed in a variety of shapes. For example, the membrane can be a hollow fiber, a flat sheet, or a pleated sheet. When the membrane is a plurality of membranes, such as a plurality of hollow fibers, the plurality of membranes can be bundled together using the blended resin described above. A plurality of hollow fiber membranes can be arranged in a substantially parallel array.

As used herein, a "blended resin potted membrane" refers to a single membrane that is potted with the blended resin or a plurality of bundled membranes (such as a plurality of hollow fiber membranes arranged in a substantially parallel array). Additionally, the same blended resin can also be used to seal the membrane or the plurality of membranes to the housing.

Figure 2A:
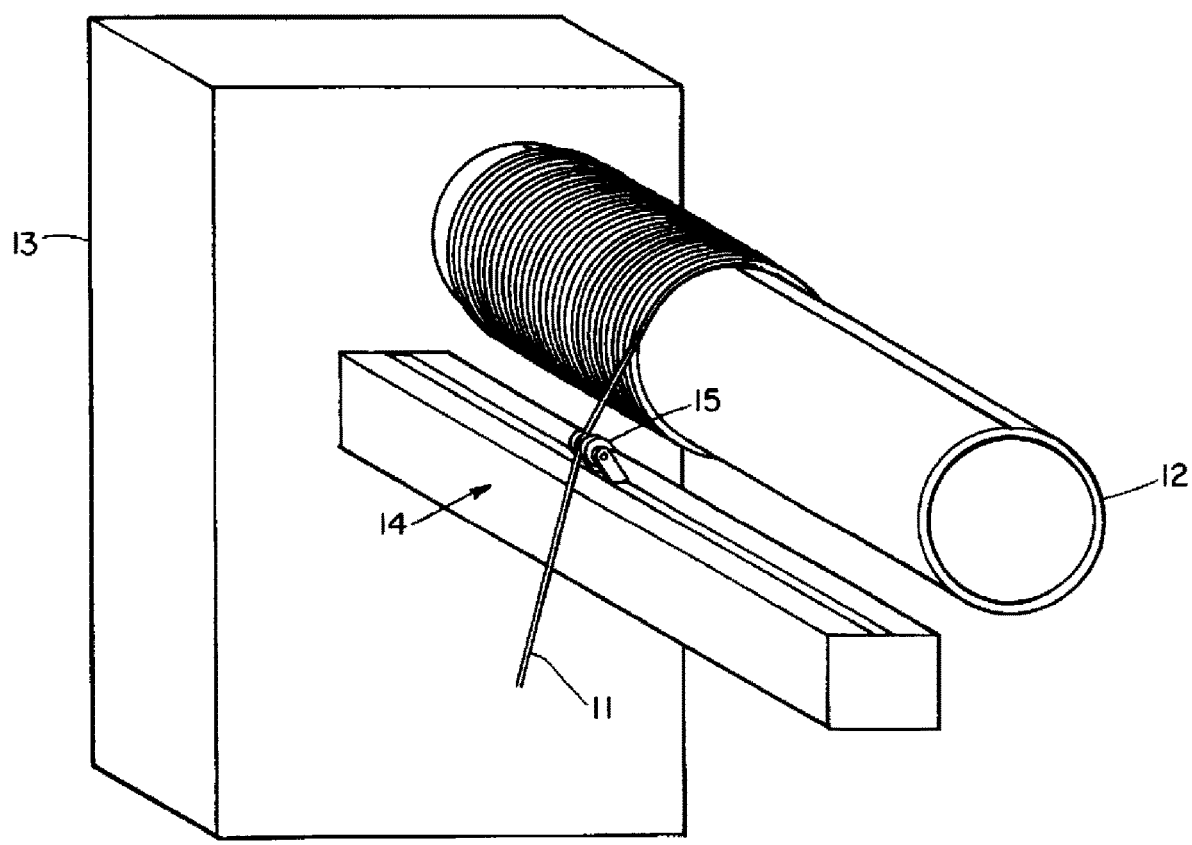
FIG. 2A is a perspective diagram of the apparatus used in the process of making an array of hollow fiber membranes in accordance with a preferred embodiment of the present invention.
Figure 2B:
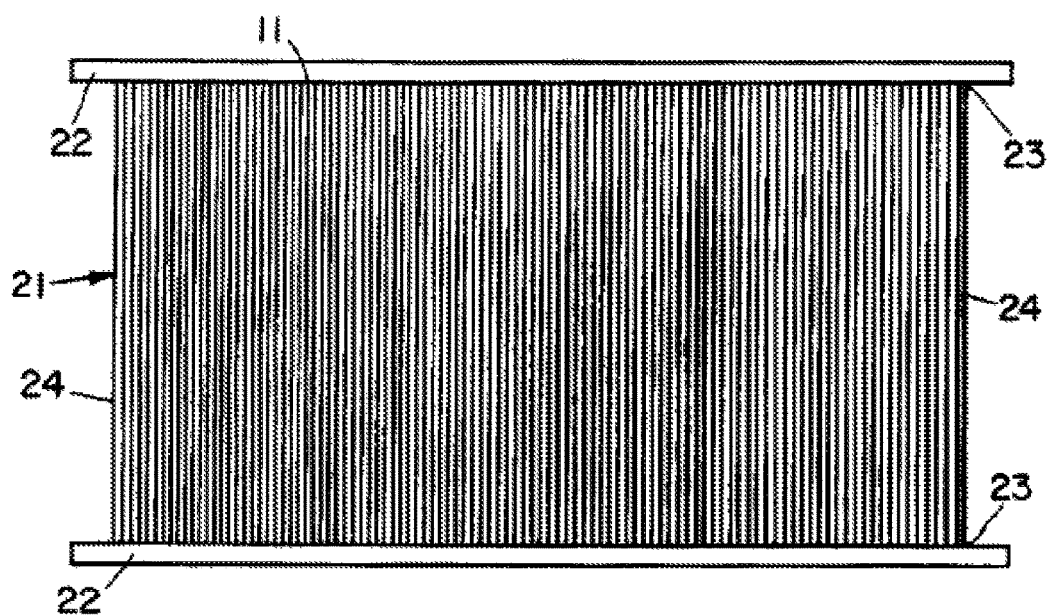
FIG. 2B illustrates a top view of a finished array of hollow fiber membranes used in carrying out the process of FIG. 2A.
Figure 3:
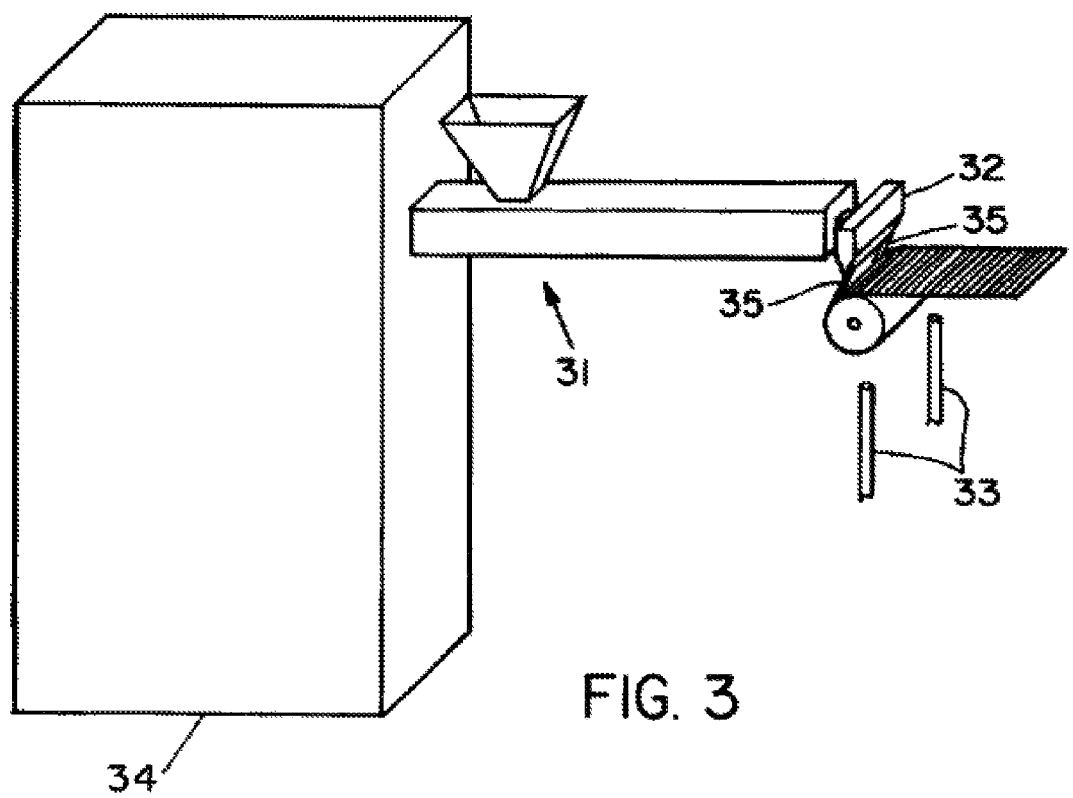
FIG. 3 is a schematic representation of the apparatus used in the process of making hollow fiber membrane modules in accordance with an example embodiment of the present invention.
Figure 4:
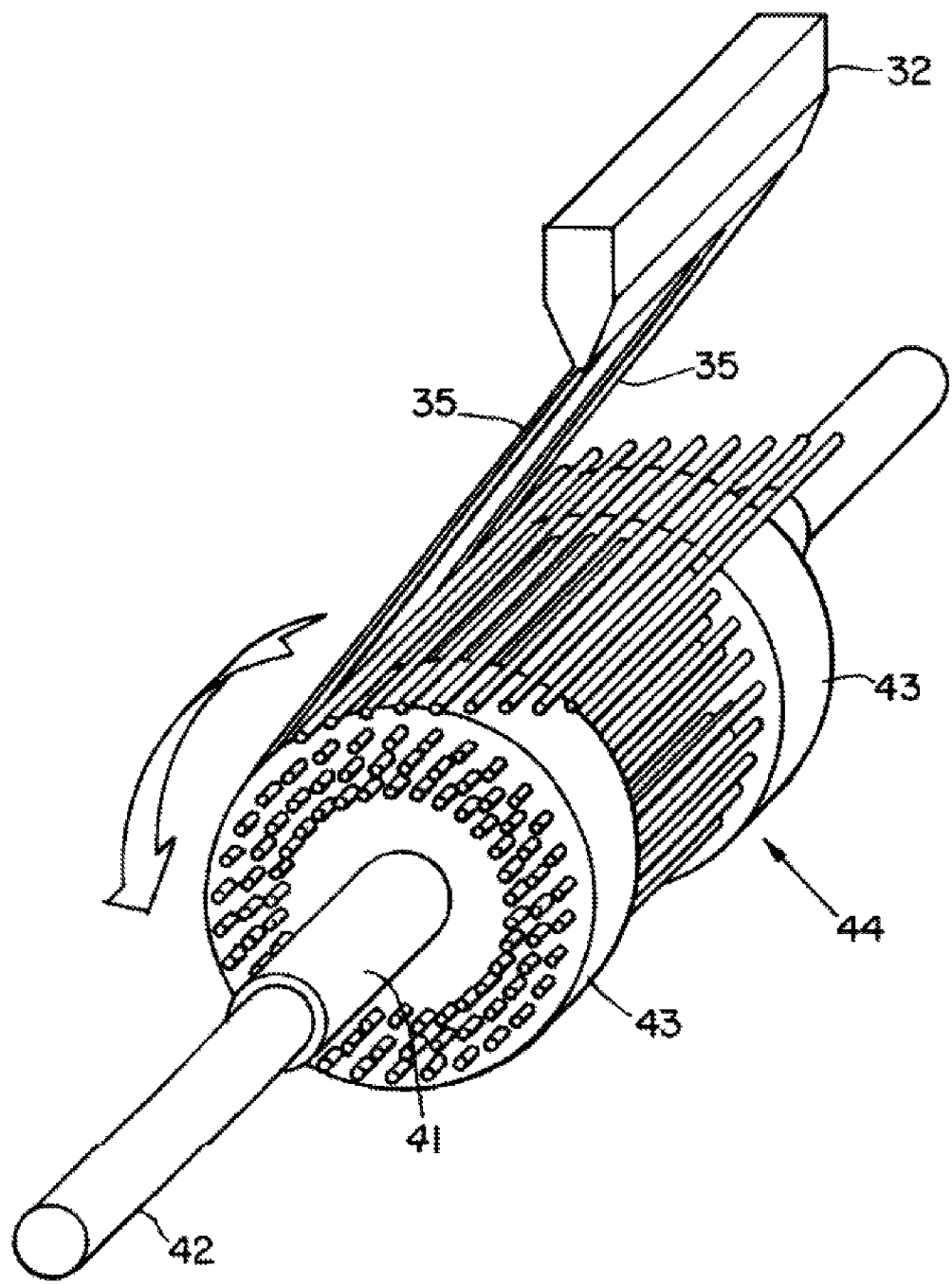
FIG. 4 is a detailed view, in perspective, showing the spiral winding sealing aspect of the hollow fiber membranes by the application of molten thermoplastic in accordance with an example embodiment of the present invention.

Methods of making blended resin potted membranes and membrane separation modules comprising blended resin potted membranes are described herein and are shown by way of example embodiments in FIGS. 2-4.

In FIG. 2A, the array 21 is fabricated by winding a continuous length of hollow fiber membrane 11 on a rotating mandrel 12 having a circular cross section. The circumference of the mandrel is chosen to be an integer multiple of the desired length of the hollow fiber membrane elements which are to comprise the finished array. The mandrel is driven by a controller 13 capable of controlling both the rotational speed of the mandrel and the tension applied to the hollow fiber membrane. The controller includes a fiber feed mechanism 14 which moves a pulley 15 parallel to the central axis of the mandrel and guides the hollow fiber membrane as it is being wound to control the spacing between adjacent fiber segments. The wound hollow fiber membrane is arranged in a single layer, with the windings being substantially parallel to one another either in contiguous contact with, or spaced uniformly apart from, one another.

When the appropriate length of hollow fiber membrane 11 is accumulated on the mandrel 12, the controller 13 stops the winding operation and one or more strips of an adhesive tape 22 are applied to the outer surface of the hollow fiber membrane segments positioned along the length of the mandrel in an orientation parallel to its axis of rotation and perpendicular to the central axes of the individual hollow fiber segments. More than one strip of tape can be used, the circumferential spacing between strips being equal to the desired axial length of the membrane fibers in the array 21. The tape extends from the first hollow fiber membrane segment wound on the mandrel to the last and preferably extends about 1 cm. beyond each end of the fiber array.

A cutting guide (not shown) may be used to slit the hollow fiber membrane segments along the middle of the entire length of the tape 22 such that the hollow fiber membranes 11 remain joined together by the now halved strip of tape. In this manner, one or more hollow fiber membrane arrays are produced, with the fiber elements being secured to one another at their ends by the tape thereby making it easily removed from the mandrel 12. It should be noted that, in this discussion, the edges 23 of the rectangular hollow fiber membrane array 21 are defined as the two surfaces formed by the end portions of the individual hollow fiber membrane elements comprising the array; the ends 24 of the array are defined by the outermost surfaces of the first and last hollow fiber membrane elements in the array. FIG. 2B shows in plan view an array formed in accordance with the above procedures. In cases where one fiber array does not contain a sufficient number of hollow fibers to fabricate a hollow fiber membrane module of the desired membrane area, the arrays may be spliced together end-to-end by means of an adhesive or other bonding mechanism to form a larger array. Any number of arrays may be so spliced together in the manner described above to form a larger array having tape extensions at the edges of both ends of the array.

Hollow fiber membranes can be arranged in a substantially parallel array, as illustrated in FIG. 2B. Once in the substantially parallel array of FIG. 2, the next operation in the fabrication of a hollow fiber membrane module is the winding of the fiber array into a bundle and the corresponding formation of a pair of tubesheets 43 at one or more of the edges 23 of the array 21. This process is shown schematically in FIGS. 3 and 4 and is known as "spiral lamination." A single screw extruder 31 is used to feed a thermoplastic sealing polymer to a dual slot extrusion die 32 which produces two polymer extrusions 35 in the form of a ribbon. A suitable length of thermoplastic tube 41 is mounted on a removable winding mandrel 42 positioned below the extrusion die, with the rotational axis of the mandrel being parallel to a line connecting the two outlets of the extrusion die. Stepper motors (not shown) are used to adjust the speed of rotation and distance between the mandrel and the die. A set of gas heaters 33 mounted on a retractable slide (not shown) are used to preheat the tube 41 prior to the fabrication of the tubesheets. The functions of the various elements described above are regulated by a programmable, microprocessor-based controller 34.

In order to maintain the molten thermoplastic polymer extrusion 35 from the die at a uniform temperature, it is preferred to operate the extruder 31 at a constant speed. Maintaining a uniform fiber spacing and tubesheet width requires that the fiber feed rate remain constant and that the distance between the extrusion die and contact point of the polymer extrusion and tubesheet 43 remain constant. The previously described controller 34 in conjunction with the apparatus discussed above accomplishes this result with feedback control mechanisms known to those skilled in the art.

Before the winding of the array 21 and the formation of the tubesheets 43, the tube 41 must be pre-heated using the heaters 33. This step is necessary to obtain a good bond between the tubesheet and the tube. Rotation of the winding mandrel 42 and tube is begun and the gas heaters are activated such that a hot gas stream impinges on the portions of the tube where the tubesheets will be formed. After a suitable time, the heaters are removed and the polymer extrusions 35 are applied to the tube.

Following the accumulation of approximately a one-half turn of the polymer extrusions 35 on the tube 41, the leading edge of the hollow fiber membrane array 21 is positioned under and parallel to the tube with the adhesive side of the extended strip of tape 22 facing the tube. The tape is then brought into contact with the tube outboard of the tubesheets 43 and allowed to wind up on the tube as the rotational speed and position of the winding mandrel 42 and tube are adjusted by the process controller 34. A slight tension is maintained on the hollow fiber array to keep the fibers in contact with the polymer extrusions. As the trailing edge of the array is wound up, the tape extensions are fastened to the previous fiber layer to form a fiber bundle 44. Application of the polymer extrusions may be terminated after the entire array is wound about the mandrel. Alternatively, the tubesheets may be built up to a larger diameter depending on the requirements of the rest of the module assembly process. In this case, the rotation of the winding mandrel continues as the molten tubesheets are allowed to cool. The end portions of the sealed fiber bundle can be trimmed to expose the fiber lumens and further machining may be performed to provide a means for sealing the fiber bundle into a suitable housing or the fiber bundle may be contoured to provide details suitable for thermoplastically bonding it to the components of a pressure housing of the same or a similar resin material in order to produce a hollow fiber module.

Figure 5:
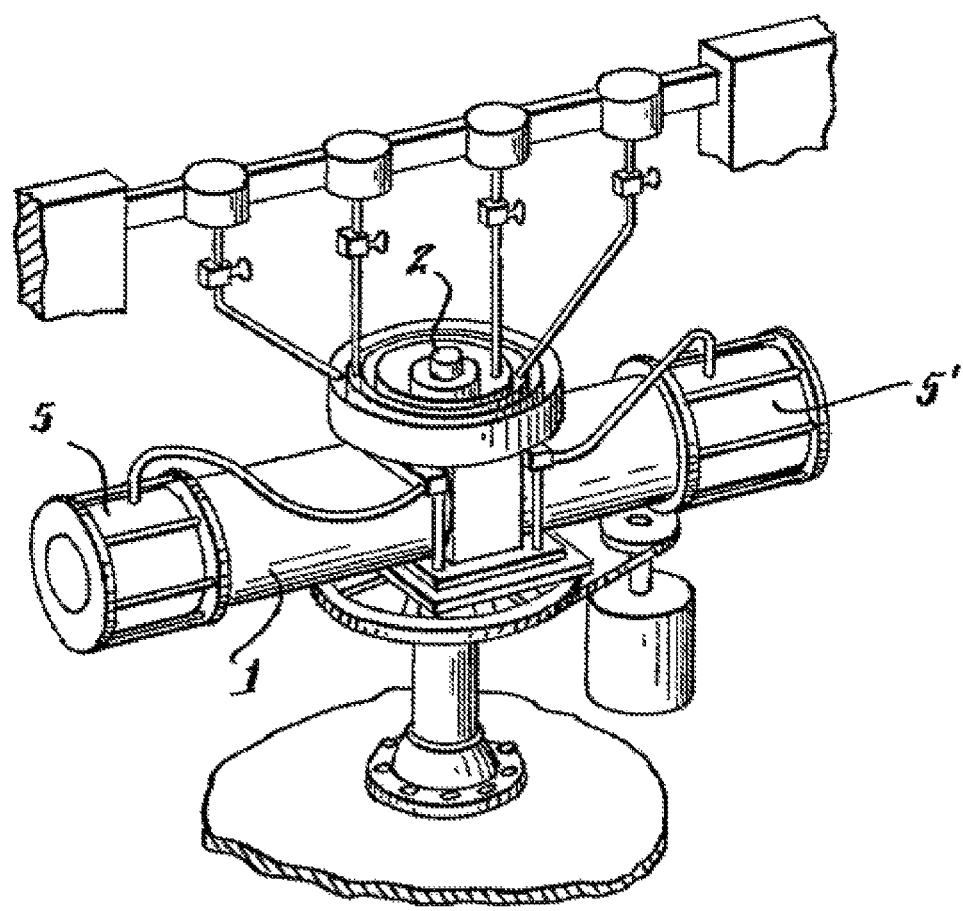
FIG. 5 illustrates an example housing for centrifugal sealing which is useful in an example embodiment of the present invention.

The membrane separation modules can also be produced via centrifugal methods. Potting by centrifugal methods comprises the steps of placing the membranes (arranged in a substantially parallel array if the membranes are hollow fibers) into a holding housing 1 such as the one seen in FIG. 5. The holding housing 1 is mounted on a rotating shaft 2 in a substantially central position. The housing has two ends, 5 and 5', which collect the molten potting resin when the holding housing 1 is spun about the axis of rotating shaft 2. Heating can be applied to the holding housing to prevent the potting resin from curing or solidifying prior to reaching the ends 5 and 5'. The holding housing is then cooled and the potting resin solidifying, creating the bundled membrane with potting resin.

The present invention also pertains to methods of making blended resin potted membranes of the invention. In one aspect, the method comprises, first, (a) providing at least one polar membrane having a first end region, a second end region and an open middle region; (b) contacting at least one of the first end region or the second end region of the at least one polar membrane with an extrusion of molten blended resin comprising a non-polar thermoplastic polymer and a polar thermoplastic polymer, wherein the molten blended resin is heated sufficiently above its melting point such that the molten blended resin flows around the at least one polar membrane, and wherein the polar thermoplastic polymer is 5% or greater by weight of the total weight percent of the molten blended resin; and (c) cooling the molten blended resin to form a fluid-tight seal between the end regions and the middle region of the at least one polar membrane.

In another example embodiment, prior to step (b), the at least one polar membrane is a plurality of hollow fibers arranged in a substantially parallel array of hollow fiber membranes wound upon an axis which is substantially parallel to the parallel array of hollow fiber membranes, creating a bundle of hollow fiber membranes.

In another example embodiment, the molten blended resin is directed onto both end regions of the bundle of hollow fiber membranes.

In yet another example embodiment, contacting the at least one of the first end region or the second end region of the at least one polar membrane includes placing the at least one polar membrane in combination with the molten blended resin into a sealed container and spinning the sealed container about an axis which is substantially perpendicular to the parallel array of hollow fiber membranes such that the molten blended resin is forced to both end regions.

In yet another aspect, the at least one polar membrane has a first end region and a second end region where both the first end region and the second end region of the at least one polar membrane are separately potted according to the method above.

An example method of sealing the membrane and blended resin bundle into a housing follows. First, the internal surfaces on both ends of the housing are heated close to their melting point or just at the melting point and immediately immersed into a cup of molten blended resin. It is preferred that each end of the tube be treated at least twice with this pre-treatment. The membrane and blended resin bundle is then inserted into the housing. One end of the housing and the bundle, together, are then placed in a pool of molten blended resin held in a container. The hollow tubes are held in a defined vertical position, maintaining the blended resin in a molten state so that it flows into the space around the membrane and vertical up the fibers, completely filling the interstitial spaces between bundle and the housing.

Once the first end of the device has been potted and fused into a unified terminal end block comprising the membrane, housing and blended resin, the second end of the device is potted. The process involves heating the potting resins in a heating cup with an external heating block or other heat source until the melt turns clear and is free of trapped bubbles (about 150° C. to about 265° C.). After the potted ends are cooled, they are then cut and the lumen of the hollow tubes exposed. The potted surfaces are then polished further using a heat gun to melt away any smeared or rough potted surfaces. For module with a large number of hollow tubes, such as 2000 or more, it is possible that the module may have potting defects which can be repaired using a clean soldering iron to fuse and close the damaged areas.

Another method useful for potting a membrane includes potting the bundle in a metal mold in a first step before sealing the bundle into a housing. The mold is slightly smaller than the inner diameter of the thermoplastic housing that the bundle will ultimately be placed in to and can be made from aluminum or nickel or similar alloys. After potting and cooling, the mold is removed. The ends of the hollow tubes in the unified terminal end blocks are opened by cutting as described above. After both ends of the membrane have been potted, the formed unified terminal end block structures are inserted into a pretreated shell housing tube, or end caps, and the unified terminal end block fused to the housing tube or end caps in a short heating process.

Finally, the blended resin potted membrane is bonded into a thermoplastic housing. It should be understood that any thermoplastic housing is contemplated for use in the invention since the blended resins described herein can form a compatible bridge between the housing and membranes that are physically and/or chemically different from each other or incompatible with each other due to differences in polarity. The housing can be constructed from a thermoplastic polymer such as, but not limited to, low density polyethylene, high density polyethylene, polypropylene, polystyrene, polybutadiene, poly(tetrafluoroethylene-co-perfluoro(alkyvinylether)), TEFLON® perfluoroalkoxyalkane (PFA), or perfluoromethylalkoxy (MFA), and nylon. Further description of housings useful in the present invention can be found in U.S. Pat. Nos. 7,308,932 and 8,091,618, which are incorporated by reference in their entirety.

The membrane separation module, when incorporated into a fluid separation device, can have a plurality of connectors which allow for the introduction of liquid feed to be separated and for extraction of the permeate and the retentate.

Figure 1B:
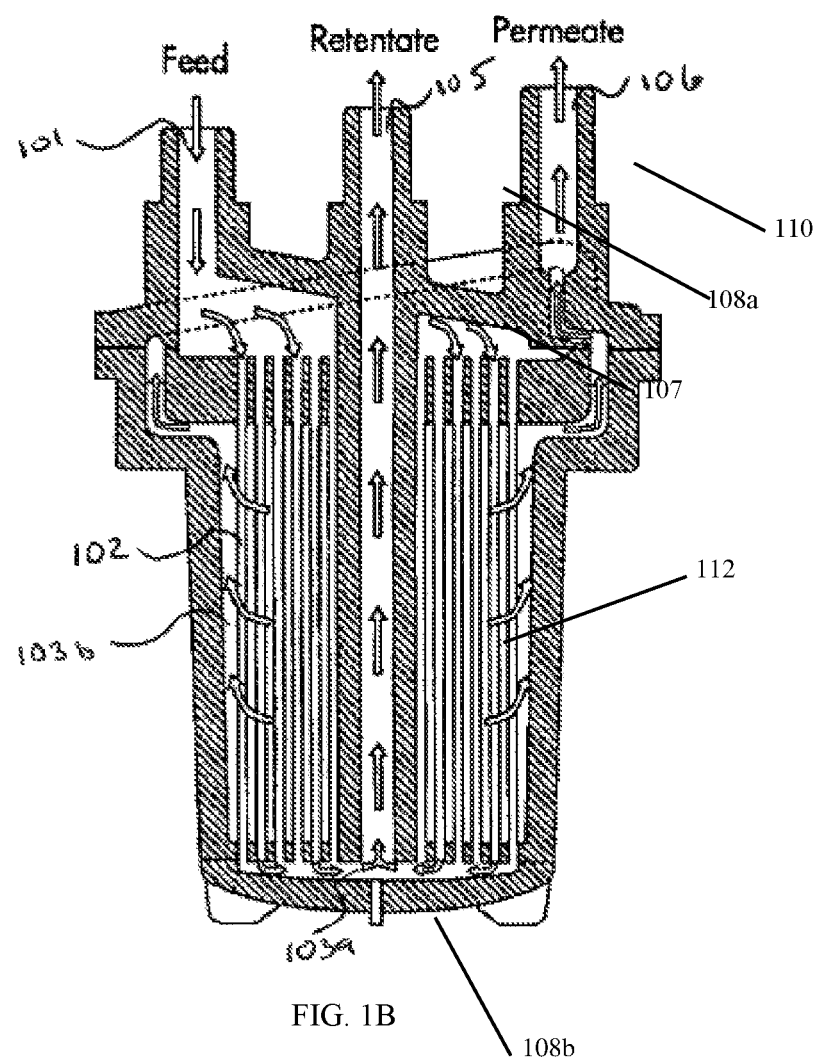

An example of a fluid separation device can be seen in FIGS. 1A-B. FIG. 1A is an external view of a fluid separation device. FIG. 1B illustrates the membrane and the flow of liquid to be separated as it enters and exits the fluid separation device. The fluid separation device comprises a housing 110 which comprises a membrane 112. The membrane 112 is potted at both end regions 108a and 108b. These end regions 108a-b form a fluid tight seal between the end regions 108a-b and the open middle region 107. The open middle region 107 is not potted and must remain open so that permeate 106 can travel through the membrane 102, as discussed below. The end regions 108a-b do not allow liquid to pass through, and are therefore "fluid-tight."

A liquid feed enters the housing at active connector 101, and is introduced to the membrane 102 inside the housing. The membrane 102 separates the space within the housing into a first volume 103a and a second volume 103b. Upon exposure of the liquid feed to the membrane 102 the permeate, which is material that passes through the microporous structure of the membrane 102, enters the second volume 103b, and the retentate, the material that does not pass through the membrane 102, enters the first volume. The retentate can then be collected or filtered further upon extraction from the housing via connector 105. The permeate exits via a different connector 106, where is can be concentrated, disposed of, or recirculated back into the system. Further examples of filtration modules as well as the process for creating said housings can be found in U.S. Pat. No. 5,762,789, which is incorporated herein by reference.

Figure 6:
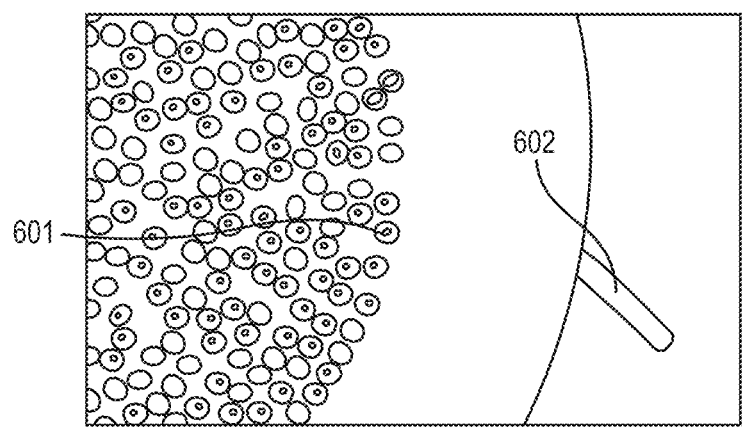
FIG. 6 is a photograph of a hollow fiber membrane pulled from a potting resin.

The structural integrity of potted membranes can be assessed using one or a combination of the following tests:

(1) The Pull Test—A membrane in a hollow fiber shape is potted and manually pulled from the potting material. If the fiber comes off the potted bundle leaving a clean void in its place, then the potting is considered a failure. If the fiber breaks from the edge of the potting leaving behind fiber in the potting it is considered to be a good potting or good adhesion. An example of a potted membrane that fails the pull test can be seen in FIG. 6. The hole 601 is where the fiber 602 was originally potted to the membrane, but was pulled out.

(2) Aerosol Test—A membrane in a hollow fiber shape is potted and installed in a fixture (e.g., a temporary housing used for testing) and challenged with aerosol particles from outside the fiber. The number of aerosol particles coming through the lumen side of the bundle can be measured using a particle detector. If the potting was integral the number of particles passing through the bundle after the challenge was similar to the background. If the potting is poor, higher number of particles can be seen when challenged with the aerosol. Since fiber defects can also contribute to such failure, it is necessary to determine whether the defect is a fiber defect or a potting defect using the Air Bubble Test described below.

(3) Air Bubble Test—A membrane in a hollow fiber shape is potted and installed in a fixture and then wetted with water or isopropyl alcohol (IPA). One of the open lumen ends of the bundle is plugged and the other open lumen end is filled with water or IPA. The bundle is pressurized with air from outside the fiber. Air bubbles are observed to come through the fiber. These air bubbles, when observed under the microscope, can be seen to either come from inside the fiber or outside the fiber in between the fiber wall and the potting material. If the air bubbles come from inside the fiber, then it is considered to be an air diffusion or fiber defect. However, if the bubbles come from outside the fiber it is considered a potting defect.

Example 1—Spiral Lamination of Polyamide (Nylon) Hollow Fiber Using HDPE Resin

Mats consisting of parallel nylon hollow fibers (NHF) were made as described above. The mats were potted at different temperatures using a high density polyethylene (HDPE) resin (Dow DMDA8965NT, Melt Index-66 g/10 mlin (ASTM 1238)) by the spiral lamination process described above. The potted fibers were allowed to cool until the potting material solidified. The excess fibers on either side of the potting were cut with a blade and the potting was machined to expose the lumen of the fiber. The fibers were then tested using the Pull Test, Aerosol Integrity Test and the Air Bubble Test to determine adhesion and integrity.

Table 1 shows the potting performance of the fibers at different temperatures

TABLE 1

| Die Temp (° C.) | Pull Test | Aerosol Integrity | Bubble Test |
| --- | --- | --- | --- |
| 235 | Fail | Fail | Fail |
| 240 | Fail | Fail | Fail |
| 250 | Fail | Pass/Fail* | — |
| 260 | Pass/Fail* | Pass/Fail* | — |
| 265 | Pass | Mostly Pass | Pass/Fail* |

*Pass/Fail indicates erratic behavior

From the above experiment it can be observed that NHF showed poor potting in HDPE until 260° C. and some improvement in potting at 265° C. However, based on the above results it was concluded that the interface between the nylon and the HDPE may not be compatible because of the frequent failures observed in the integrity of the bundle. It was thought that temperatures >265° C. might solve the problem. However, similar erratic behavior was observed when nylon was potted at temperatures above 265° C. (e.g., at this temperature the potted bundle sometimes passed the test, and sometimes failed). This was accompanied by severe degradation of the fiber and large voids in the potting material.

Example 2—Centrifugal Potting of Polyamide (Nylon) Hollow Fiber Using a HDPE, AHDPE and Blends of HDPE and AHDPE Potted modules of NHF were made using centrifugal potting using the following procedure. Each module consisted of 20 loops of nylon hollow fiber, 4 inches long, 750 micron outside diameter and 450 micron inside diameter. The fibers were placed in a polyfluoroalkoxy (PFA) tube, 5 inch long and half inch inside diameter. The tube was then placed into the centrifuge block. There were two blocks in the centrifuge fixture, one at each end. Potting materials was poured into the cylindrical resin reservoir on top of each block.

The centrifuge fixture was then placed into a heated spinning apparatus. The apparatus was heated at 175° C. for 2 hours. The fixture was then spun at 500 rpm and after 15 minutes the heating was stopped. When the temperature reached 50° C., the spinning was stopped. The fixture was then removed from the spinning apparatus and the potted modules were obtained. The potted modules were then subjected to the pull test. The above process was repeated with HDPE, anhydride high density polyethylene (AHDPE) and different blends of HDPE and AHDPE as shown Table 2.

TABLE 2

| Sample # | Potting material (% wt) | Anhydride Group (% by FTIR) | Hand pull test |
|---|---|---|---|
| 1 | HDPE (100) | 0 | Fail |
| 2 | AHDPE (100) | 1 | Pass |
| 3 | HDPE:ADHPE (50:50) | 0.5 | Pass |
| 4 | HDPE:ADHPE (80:20) | 0.2 | Pass |
| 5 | HDPE:ADHPE (90:10) | 0.1 | Pass |
| 6 | HDPE:ADHPE (95:5) | 0.05 | Pass |

The results from Table 2 suggest that HDPE is not a suitable potting material for the nylon fiber. AHDPE alone or blends of AHDPE with HDPE (as low as 5% by weight: 95% by weight, respectively) can give significantly improved bonding between the potting material and nylon hollow fiber, as illustrated because the fiber does not pull out of the potted resin.

Example 3—Spiral Lamination of Polyamide (Nylon) Hollow Fiber Using a Blend of HDPE and AHDPE Mats of parallel nylon hollow fibers were made as described above. The mats were potted at different temperatures using a blend of 90% by weight HDPE resin (Dow DMDA8965NT, Melt Index-66 g/10 mlin) and 10% by weight AHDPE (TWO H Chemicals, Melt Index—20 g/10 min (ASTM-1238)) by the spiral lamination process described above. The potted fibers were allowed to cool until the potting material solidified. The excess fibers on either side of the potting were cut with a blade and the potting was machined to expose the lumen of the fiber. The fibers were then tested using the Pull Test, Aerosol Test and the Air Bubble Test to determine adhesion and integrity.

Table 3 shows the potting performance of the fibers at different temperatures.

TABLE 3

| Die Temperatures (° C.) | Pull Test | Aerosol Integrity | Bubble Test |
|---|---|---|---|
| 235 | Pass | Pass | Pass |
| 240 | Pass | Pass | Pass |
| 250 | Pass | Pass | Pass |
| 255 | Pass | Pass | Pass |
| 260 | Pass | Pass | Pass |
| 265 | Pass | Pass | Pass |

The results in Table 3 show that addition of AHDPE to the HDPE improved the integrity of the bundles by increasing the surface interaction of the potting material with the fiber as compared to potting with HDPE alone, as illustrated in Table 1.

Example 4—Centrifugal Potting and Tensile Testing of Potted Fibers

NHF were potted using method described in Example 2. The potting of the fibers were trimmed to the same length of 0.1 inches (See FIG. 3). The fibers from the potting were then pulled from the potting using an Instron tester. The maximum stress and strain to pull or break the fiber from the potting was measured to determine the strength of the potting to the nylon fibers. Greater the stress and strain required to pull the fiber from the potting the stronger should be the potting.

Figure 7:
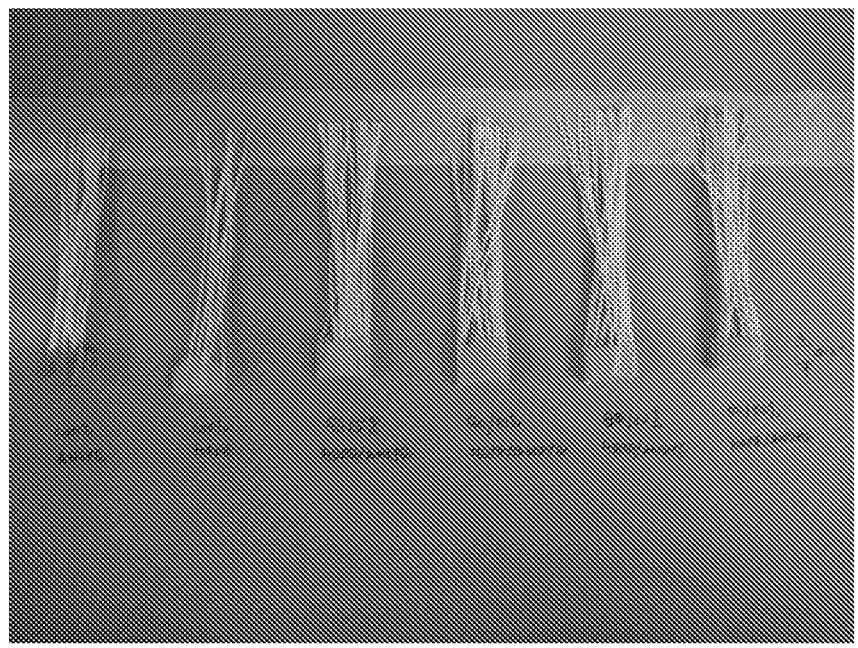
FIG. 7 is a photograph illustrating the results of the tensile testing in Table 4.

Table 4 illustrates the strength of bonding between the nylon hollow fiber and the potting material measured using tensile testing. FIG. 7 illustrates the results of the tensile testing on the potted fibers listed in Table 4.

TABLE 4

| | Fiber and Potting Material | |
|---|---|---|
| | Tensile Strain at Maximum Load | Tensile Stress at Maximum Load |
| (Potting material Weight %) | (%) | (kgf/cm$^2$) |
| Nylon HF (control 1) | 62.5 | 3.64 |
| Nylon HF (control 2) | 36.84 | 3.4 |
| HDPE (100)-1 | 13 | 2.79 |
| HDPE (100)-2 | 15.67 | 2.86 |
| HDPE:ADHPE (95:5)-1 | 32.33 | 3.3 |
| HDPE:ADHPE (95:5)-2 | 39.34 | 3.92 |
| HDPE:ADHPE (90:10)-1 | 32.5 | 3.49 |
| HDPE:ADHPE (90:10)-2 | 57.67 | 3.66 |
| HDPE:ADHPE (80:20)-1 | 39.17 | 3.15 |
| HDPE:ADHPE (80:20)-2 | 63.84 | 3.33 |
| HDPE:ADHPE (50:50)-1 | 119 | 3.73 |
| HDPE:ADHPE (50:50)-2 | 38.33 | 3.33 |
| AHDPE(100)-1 | 37 | 3.19 |
| AHDPE(100)-2 | 31.33 | 3.25 |

As can be seen from Table 4, the tensile strain at maximum load and the tensile stress at maximum load for the NHF potted using AHDPE or HDPE/AHDPE blends are very similar to that of the nylon hollow fiber. Without being bound to any particular theory, it is hypothesized that the cause for this is the maximum stress and strain for both these conditions correspond to the breaking of the fiber. Therefore, the potting of the fiber is strong, even at a 5% blend of AHDPE in HDPE. In the case of the NHF potted using HDPE, the maximum stress and strain are much lower than the ADPE or HDPE/AHDPE blend because the fiber slips from the potting material. The potting of the HDPE to the NHF, therefore, is weak. The above results are surprising because only a 5% (wt %) blend of AHDPE (containing only 1% anhydride groups by FTIR) in HDPE which corresponds to a content of anhydride groups as low as 0.05% in the blend creates such a significant increase in the potting strength that there is no slip of fiber from the potting.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A blended resin potted membrane, comprising:
   at least one membrane constructed of a first material and having a first end region, a second end region, and a middle region; and
   a thermoplastic blended potting resin comprising a thermoplastic polymer modified with polar groups,
   wherein the polar groups are about 0.1% or greater by weight of the total weight of the modified thermoplastic polymer,
   wherein the polar groups are amides, alcohols, acid anhydrides, cyanides, sulfates, sulfonates, carboxylic acids, aldehydes, amines or ammonium groups, and
   wherein at least one of the first end region and the second end region are encapsulated with the thermoplastic blended potting resin and bonded by the thermoplastic blended potting resin to a housing constructed of a second material, wherein the first material and the second material are physically or chemically incompatible.

2. The blend resin potted membrane of claim 1, wherein the modified thermoplastic polymer comprises polar groups from about 0.05% to about 75% by weight of the total weight of the modified thermoplastic polymer.

3. The blended resin potted membrane of claim 1, wherein the at least one membrane is a hollow fiber, a flat sheet, or a pleated sheet.

4. The blended resin potted membrane of claim 3, wherein the at least one membrane is a hollow fiber.

5. The blended resin potted membrane of claim 1, wherein the at least one membrane is a plurality of membranes.

6. The blended resin potted membrane of claim 1, wherein the at least one membrane is a polyamide, a polyimideamide, a polyimide, a polysulfone, a cellulose acetate, a polyvinyl alcohol or a polyacrylate.

7. A membrane separation module, comprising:
   at least one membrane constructed of a first material,
   wherein the at least one membrane has a first potted end region, a second potted end region, and an open middle region, and
   wherein the first potted region and the second potted region encapsulated in a thermoplastic blended potting resin comprising a thermoplastic polymer modified with polar groups, wherein the polar groups are about 0.1% or greater by weight of the total weight of the modified thermoplastic polymer, and wherein the polar groups are amides, alcohols, acid anhydrides, cyanides, sulfates, sulfonates, carboxylic acids, aldehydes, amines or ammonium groups; and
   a housing constructed of a second material sealingly bonded to the membrane by the thermoplastic blended potting resin;
   wherein the first material and the second material are physically or chemically incompatible; and
   wherein the two potted end regions are encapsulated with the thermoplastic blended potting resin to form a fluid-tight seal between the two potted end regions and the open middle region.

8. The membrane separation module of claim 7, wherein the at least one membrane is a hollow fiber, a flat sheet, or a pleated sheet.

9. The membrane separation module of claim 7, wherein: (1) the first material is a polar material and the second material is a non-polar material; or (2) the first material is a non-polar material and the second material is a polar material.

10. A fluid separation device, comprising:
    a housing having:
      a first end and a second end;
      a separation element contained within the housing to divide the interior of the housing into first and second volumes, the separation element comprising the membrane separation module of claim 7 and a series of flow passages upstream and downstream of said membrane module, and wherein the membrane module is bonded to the housing by the blended resin;
    a first connector at the first end for introducing a fluid feed to the interior of the housing;
    a second connector for removing a permeate from the interior of the housing;
    a central conduit attached to the first connector and extending longitudinally within the housing to the second end so as direct all of the flow between the first connector and the second end;
    wherein the second end is in fluid communication with the first volume, wherein the second volume is in fluid communication with the second connector, and wherein a fluid fed into the first connector is processed by the separation element to form the permeate collected and removed by the second connector.

* * * * *